US007761956B2

(12) United States Patent
Dahmen et al.

(10) Patent No.: US 7,761,956 B2
(45) Date of Patent: Jul. 27, 2010

(54) DRY CLEANING SYSTEM FOR WORKPIECES

(75) Inventors: Dieter Dahmen, Herne (DE); Harald Dahmen, Herne (DE)

(73) Assignee: TRT Oil-Off GmbH, Herne (DE)

( * ) Notice: Subject to any disclaimer, the term of this patent is extended or adjusted under 35 U.S.C. 154(b) by 984 days.

(21) Appl. No.: 10/516,162

(22) PCT Filed: May 31, 2002

(86) PCT No.: PCT/EP02/05959

§ 371 (c)(1),
(2), (4) Date: Jun. 30, 2005

(87) PCT Pub. No.: WO03/101634

PCT Pub. Date: Dec. 11, 2003

(65) Prior Publication Data

US 2006/0037168 A1    Feb. 23, 2006

(51) Int. Cl.
*A47L 5/38* (2006.01)
(52) U.S. Cl. .......................................... 15/345; 15/301
(58) Field of Classification Search .................. 15/345, 15/30, 302, 311, 346, 301
See application file for complete search history.

(56) References Cited

U.S. PATENT DOCUMENTS

| 4,381,577 A | 5/1983 | Boye et al. |
| 5,661,872 A | 9/1997 | Meyer et al. |
| 5,991,965 A * | 11/1999 | Stroh et al. ................ 15/310 |
| 6,245,154 B1 * | 6/2001 | Dohrer ........................ 134/1 |

(Continued)

FOREIGN PATENT DOCUMENTS

DE     295 20 880 U1     8/1996

(Continued)

OTHER PUBLICATIONS

International Search Report, Jan. 2003.

*Primary Examiner*—Lee D Wilson
(74) *Attorney, Agent, or Firm*—Collard & Roe, P.C.

(57) ABSTRACT

A system for dry cleaning workpieces by removing solid and/or liquid particles adhereing thereto with a gaseous medium by suction. To this end, a suction mold encloses the workpieces on all sides while serving as a guiding device whose inner contour follows the outer contour of the workpiece. The cleaning medium flows to the gaps between the suction mold and the workpiece via feed slots and/or feed boreholes of the suction mold. Gaps, medium feed slots and/or medium feed boreholes are formed, arranged and dimensioned so that the flowing medium has a velocity of greater than 20 m/s everywhere on the surface of the workpiece, and the solid and/or liquid particles adhereing thereto are carried away. The suction slot, through which the flowing medium is removed by suction, and the suction duct which is connected thereto and which leads to the suction unit, has larger cross-sections than the sum of the cross-sections of all the gaps between the workpiece and the suction mold, and also the sum of the cross-sections of the medium feed slots and/or of the medium feed boreholes. The sum of the cross-sections of the medium feed slots and or of the medium feed boreholes corresponds to 0.9 to 1.2 times the sum of the cross-sections of all the gaps between the workpieces and the suction molds.

10 Claims, 2 Drawing Sheets

U.S. PATENT DOCUMENTS

Figure 1:
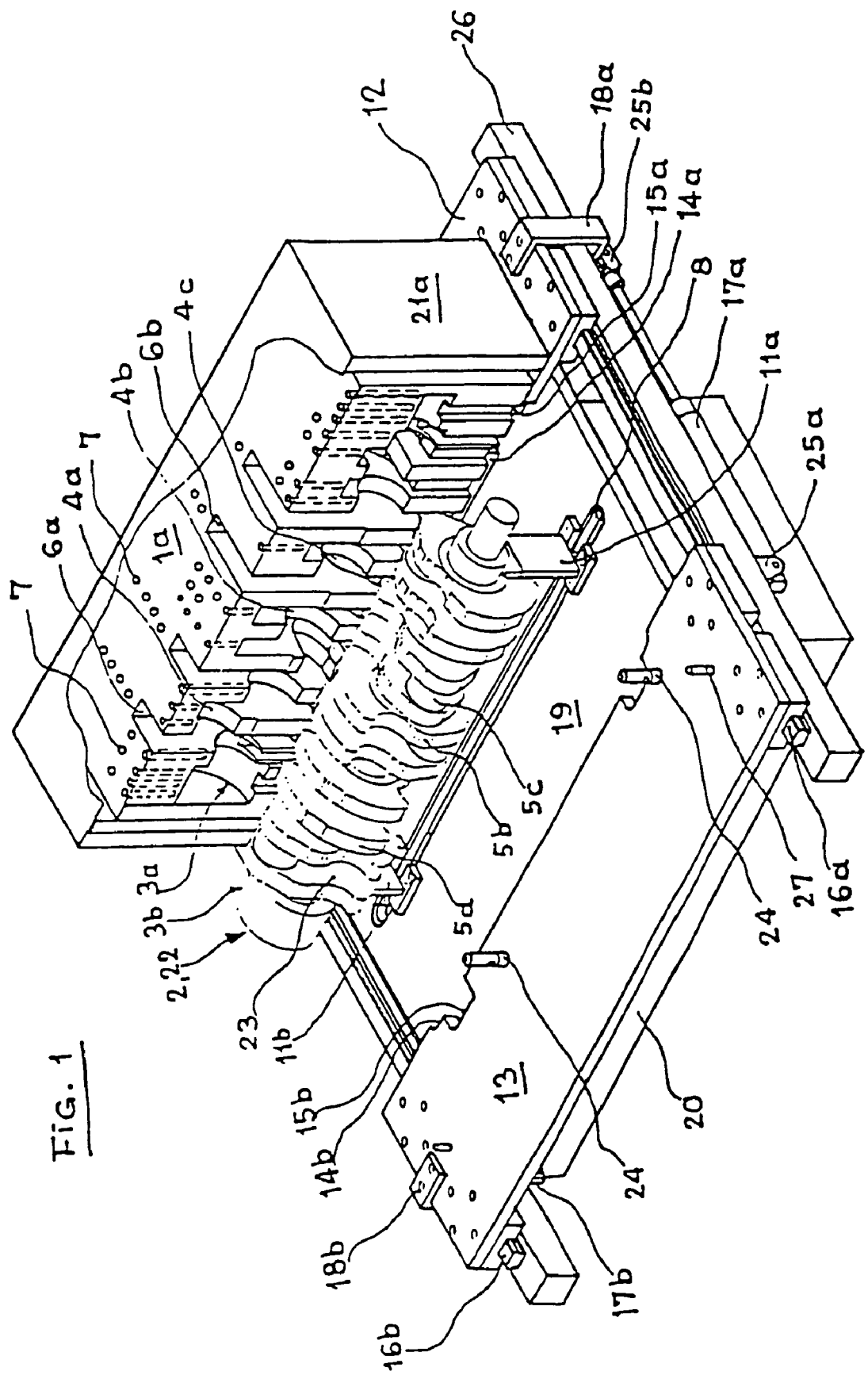

| | | | |
|---|---|---|---|
| 7,047,984 B2 * | 5/2006 | Blattner et al. | 134/1.3 |
| 2002/0092121 A1 * | 7/2002 | Momonoi et al. | 15/345 |
| 2003/0145418 A1 * | 8/2003 | Ikeda et al. | 15/345 |
| 2006/0037168 A1 * | 2/2006 | Hahmen et al. | 15/301 |

FOREIGN PATENT DOCUMENTS

| | | |
|---|---|---|
| DE | 196 29 436 A | 1/1998 |
| DE | 196 33 771 A | 2/1998 |
| DE | 196 51 791 A | 6/1998 |
| DE | 198 17 813 C | 7/1999 |
| DE | 200 06 491 U | 6/2000 |
| EP | 0 693 325 A | 1/1996 |
| WO | WO 01 76777 A | 10/2001 |
| WO | WO 01/76777 A | 10/2001 |

\* cited by examiner

DRY CLEANING SYSTEM FOR WORKPIECES

CROSS REFERENCE TO RELATED APPLICATIONS

Applicants claim priority under 35 U.S.C. §365 and §119 of PCT/EP02/05959 filed on May 31, 2002. The international application under PCT article 21(2) was not published in English.

The invention relates to a system for dry cleaning of work pieces with a gaseous medium, by means of suctioning off solid and/or liquid particles that adhere to them, having a suction channel that leads to a suction unit, and a guide device that precedes the suction channel, by means of which the suction stream in the region of the surface of the work piece is guided in such a manner that a flow is formed at the surface of the work piece, which entrains the adhering solid and/or liquid particles.

Systems for dry cleaning of work pieces after cutting machining are used to remove residues or processing aids of the machining process. They are increasingly replacing wet methods in which solvents are used, from which residues can subsequently be removed only with great effort, if at all, in order to process them as recycled materials. In contrast, after dry cleaning, the liquid residues, such as emulsions or lubricant oil, can easily be separated from the solid contaminants, such as chips, by means of microfilters, and can be used for machining once again. Metallic residues, on the other hand, can be processed as recycled materials.

The known dry-cleaning methods of work pieces include the removal of the residues by means of blowing them off using jets that are directed at the work piece (see U.S. Pat. No. 4,381,577). It has been shown, however, that the energy expenditure is relatively high, in order to produce an air volume having the required excess pressure to remove the residues on the entire surface of the work piece. In order to increase the effectiveness of the generated air stream, other methods additionally use suction systems and/or support the release of the residues by putting the work piece into vibration or rotation (see DE 295 20 880 U1 and DE 196 29 436 A1).

Another method for dry cleaning of work pieces is limited to the use of suction systems (see DE 196 29 436 A1 and DE 196 33 771 C2). However, because of the non-uniform flow of the air that is suctioned off, complete cleaning of the work piece on its complex surface is difficult to achieve, and is connected with a significant energy expenditure to generate a high volume stream and very low pressures. Here, too, additional vibration generators are generally used.

Passing the air flow through a guide plate, as is provided by another method, is also insufficient (see DE 196 29 436 A1). It is true that in this manner, the flow velocity can generally be increased, if a suitable arrangement is used. However, the suction air takes the path of least resistance, which means that it follows the contour of the guide plate and not the complex contour of the work piece. A precisely defined flow behavior at all points of the outside contour of the work piece consequently does not exist. Here again, additional supportive measures, such as blowing, are required. The stated cleaning device relates to a chamber system in which the work piece can furthermore be rotated. Particularly for work pieces having complex surfaces, this means that a sufficient distance between the work piece and the guide plate is required, and this again puts the flow that is sufficient for the cleaning effect in doubt.

It is therefore the task of the invention to further develop the system for dry cleaning of work pieces, of the type stated initially, in such a manner that an optimal flow behavior of a gaseous flow medium is formed on the entire surface of the work piece, and therefore a good cleaning of the work piece is achieved. At the same time, the amount of energy required for this is supposed to be decisively reduced.

To accomplish this task, the invention proposes, proceeding from the system for dry cleaning of work pieces of the type stated initially, that the guide device is configured as a suction mold that surrounds the work piece on all sides, the inside contour of which follows the outside contour of the work piece and leaves defined gaps towards the outside contour of the work piece, to which a gaseous medium flows by way of feed slits and/or feed bores in the suction mold, whereby the gaps, on the one hand, and the medium feed slits and/or medium feed bores, on the other hand, are configured, arranged, and sized in such a manner that the flow velocity of the gaseous medium is more than 20 m/s everywhere on the surface of the work piece.

In the system for dry cleaning of work pieces according to the invention, a suction mold surrounds the work piece to be cleaned. The inner contours of this suction mold essentially represent the negative image of the contours of the work piece. This makes it possible to define the gaps around the work piece in such a manner that a flow velocity of the gaseous medium that is proportional to the suctioning is brought about by means of their cross-section. The distances between the work piece and the suction mold should be 1 mm to 5 mm. The gaseous medium flows into the gaps between the suction mold and the work piece through feed slits and/or feed bores that are made in the suction mold at defined locations. In this way, the flow of the gaseous cleaning medium is passed to the surface of the work piece in targeted manner.

In order to ensure that the flow medium passes uniformly over the entire surface of the work piece, both the sum of the cross-sections of the feed slits and feed bores for the gaseous medium and the sum of the cross-sections of the gaps between the suction mold and the work piece should be smaller than the opening cross-section of the suction slit through which the gaseous medium leaves the suction mold. The suction slit must extend at least over the entire length of the work piece. The accelerated flow medium entrains solid and/or liquid particles adhering to the work piece. This process is supported by the pressure drop that occurs at an increased flow velocity.

The sum of the cross-sections of the feed slits and feed bores at which a gaseous flow medium enters into the suction mold must permit a sufficiently large volume stream. On the other hand, an overly great total cross-section can have a detrimental influence on the flow behavior at the surface of the work piece and result in non-uniform impact, so that the in-flow velocity at various parts of the work piece is too low. Under certain conditions, it is advantageous to accelerate the medium in advance, as it enters into the suction mold, by making the slits and bores appropriately small. Empirical and mathematical studies have shown that optimal cleaning effects can be achieved if the sum of the cross-sections of the feed slits and feed bores for the gaseous medium corresponds to 0.9 to 1.2 times the sum of the cross-sections of all the gaps between the work piece and the suction mold that surround the work piece.

From this constellation, the result is obtained that the flow velocity of the gaseous medium is greatest around the work piece. Starting from the suction slit, and in the subsequent suction channel, in the direction of the suction unit, a lower flow velocity occurs with great cross-sections. It is practical if the connection cross-sections in the suction channel and to the suction unit itself are additionally expanded. This results in calming of the flow, which promotes precipitation of the heavier particles out of the residues of machining of the work piece.

The accelerated flow medium in the gap between the suction mold and the work piece entrains the residues from machining of the surface of the work piece. This effect is promoted by the fact that an increasing flow velocity is accompanied by a pressure drop, so that a partial vacuum occurs. According to empirical studies, the best results for loosening emulsions, lubricant oil, and other residues from cutting machining can be expected at flow velocities of at least 20 m/s, for the planned areas of use.

Figure 2:
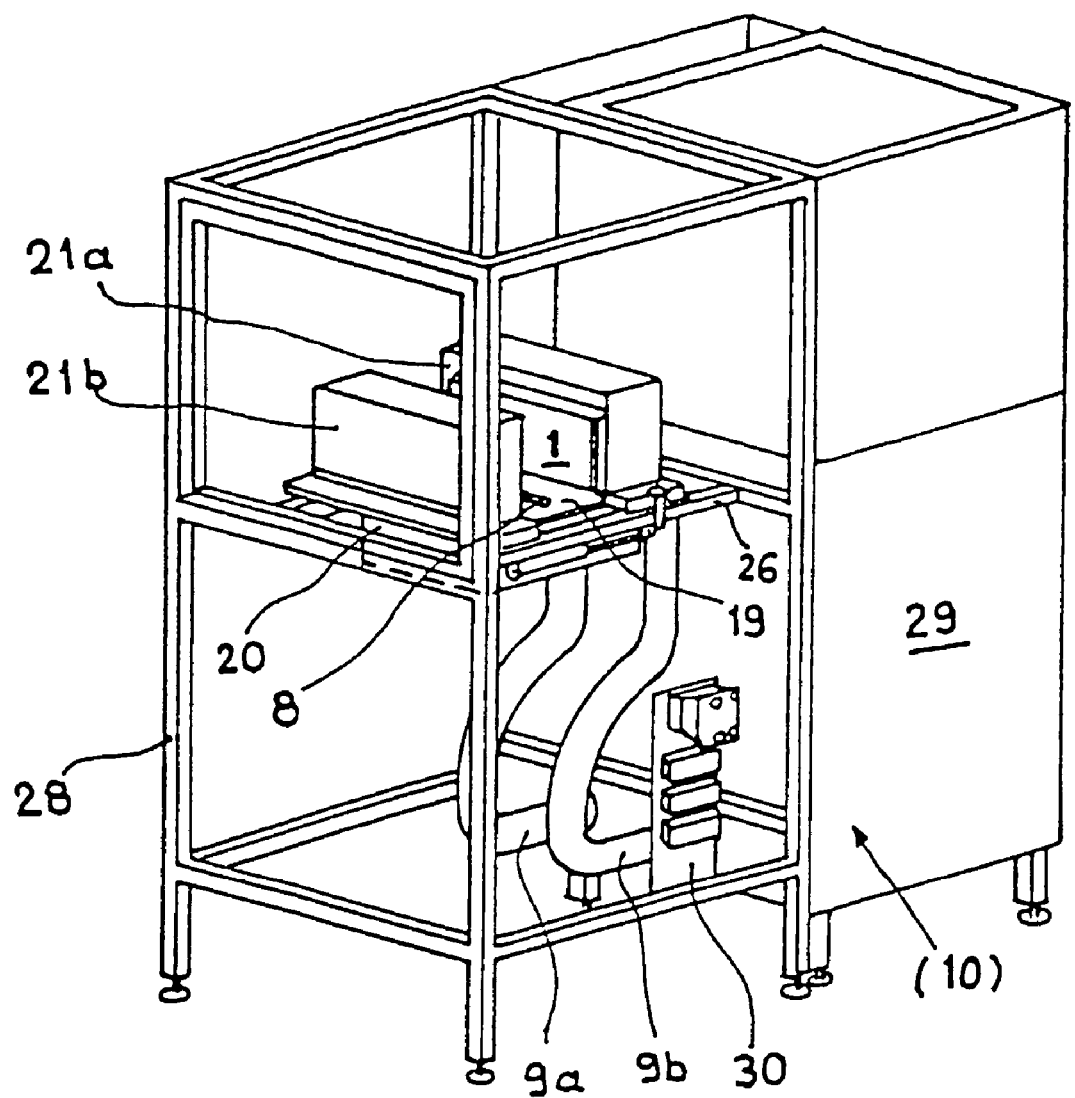

An exemplary embodiment of the invention will be explained in greater detail below, using drawings. These show:

FIG. 1: a perspective view of the system according to the invention for dry cleaning of work pieces, in the open state;

FIG. 2: a perspective view of a complete cleaning station with an integrated dry-cleaning system.

The system for dry cleaning of work pieces 2, as shown, is designed for secondary processing of crankshafts 22. It consists essentially of the suction mold, only one half 1a of which is shown, the pusher plates 12, 13 with setting devices 17a, 17b, the noise protection hood 21, and a base plate 19.

The suction slit 8, through which the gaseous cleaning medium, in this case air, containing the particles released from the crankshaft, as residues from cutting machining, goes in the direction of a suction unit 10, not shown, is located in the base plate 19. Consoles 11a and 11b, in which the crankshaft 22 is mounted relative to the system and above the suction slit 8, are located on both sides of the suction slit 8.

The suction mold 1, only one half 1a of which is shown here, is pushed together for the cleaning process, so that it surrounds the crankshaft 22. For this purpose, the suction mold 1 is provided with inside contours 4a, 4b, and 4c, into which the cropped parts 23 of the crankshaft 22, which is aligned relative to the suction mold 1, project with their outside contours 5a, 5b, and 5c. Only a distance of 1 to 5 mm remains between the suction mold 1 and the crankshaft 22, in the state closed for cleaning. Feed slits 6 and feed bores 7 made in the suction mold 1 serve to distribute the gaseous flow medium in targeted manner, and thereby to supply it even to the cropped parts 23 of the crankshaft surface that project into the suction mold 1.

The suction mold halves 1a, 1b can be mounted on the pusher plates 12, 13, by means of pins 24, in bores prepared for that purpose, so that they can be easily replaced. In this way, the dry-cleaning system can quickly and easily be re-fitted for work pieces other than the crankshaft 2 having different shapes and dimensions, for example camshafts or also crankshafts for engines having different numbers of cylinders.

The pusher plates 12, 13 are guided on rails 16a, 16b so that they can be displaced. For this purpose, setting devices 17a, 17b are attached to the supporting construction 26 of the system with their statically fixed end 25a, and attached to the pusher plates 12, 13 with their end 25b that can move out, by way of stirrups 18a, 18b. By means of synchronization of the setting devices 17a, 17b, the pusher plates 12, 13 are synchronously moved together, with the suction mold halves 1a, 1b, and positioned symmetrically to the work piece 2. This ensures that the gaps 3a, 3b between the inside contour 4 of the suction mold and the outside contour 5 of the work piece 2 are identical for the suction mold half 1a and the suction mold half 1b.

In the region of the consoles 11a, 11b for mounting the crankshaft 22, there are recesses 15a, 15b in the pusher plates 12, 13. Because of the recesses 14a, 14b, the cross-section of the suction slit remains free, even if the pusher plates are pushed together for the cleaning process.

A two-part noise protection hood 21a, 21b is also mounted on the pusher plates 12, 13. It surrounds the suction mold halves 1a, 1b and is pushed together, along with them, by means of the pusher plates, in such a manner that only a defined gap remains for the inflow of air as the cleaning medium. The noise protection hood 21a, 21b can be easily replaced, like the suction mold, and is mounted on the pusher plates with pins 27.

The dry-cleaning system according to the invention is mounted on the support frame 28 of a cleaning station, as shown schematically in FIG. 2. A collection container 20 below the base plate 19 first collects the residues from the cleaning medium. Connected with this are two suction channels or hoses 9a, 9b, through which the cleaning medium gets into a collection container 29, not shown in detail. A control panel 30 having various control and regulation elements allows further settings for optimal functioning of the system.

The invention claimed is:

1. System for dry cleaning of work pieces with a gaseous medium, by means of suctioning off solid or liquid particles that adhere to them, having a suction channel (9) that leads to a suction unit (i0), and a guide device that precedes the suction channel, by means of which the suction stream in the region of the surface of the work piece (2) is guided in such a manner that a flow is formed at the surface of the work piece, which entrains the adhering solid or liquid particles, whereby the guide device is configured as a suction mold (I) that surrounds the work piece on all sides, the inside arcuate contours (4) of which follows the outside contours of the work piece (5) and leaves defined gaps (3) which are a surface volume of a space inbetween wall of said arcuate contours,
   wherein a gaseous medium flows to the gaps by way of feed slots (6) and feed bores (7) in the suction mold,
   whereby the gaps (3), and the medium feed slots (6) and medium feed bores (7), are configured, arranged, and sized in such a manner that the flow velocity of the gaseous medium is more than 20 m/s within said arcuate contours and said gap;
   wherein the suction channel (9) is connected with the interior of the suction mold (1) by way of a suction slot (8) that extends at least substantially over an entire length of the suction mold which has the work piece
   wherein the suction slot (8) and the adjoining suction channel (9) are each of larger cross-sections than the sum of the cross-sections of all of the gaps (3) and the sum of the cross-sections of the feed slots (6) and feed bores (7) for the gaseous medium;
   wherein the sum of the cross-sections of the feed slots (6) and feed bores (7) for the gaseous medium corresponds to 0.9 to 1.2 times the sum of all the gaps (3)
   wherein the contours (4) of the suction mold (I) follow the contours (5) of the work piece (2) at a spacing of between 1 mm and 5 mm.

2. The system as recited in claim 1,
   wherein the suction unit (10) has a flat characteristic and works at a partial vacuum of 50 mbar to 100 mbar.

3. The system as recited in claim 1,
   wherein the suction mold (1) consists of two halves (1a, 1b).

4. The system as recited in claim 3,
   wherein the suction mold (1) is surrounded by a noise protection hood (21) during the cleaning process.

5. The system as recited in claim 4, wherein the noise protection hood (21) consists of two halves (21a, 21b), which are mounted on the movable pusher plates (12, 13).

6. The system as recited in claim 5, wherein the noise protection hood (21) permits the inflow of a gaseous medium.

7. The system as recited in claim 1, wherein the suction mold (1) or the suction mold halves (1a, 1b) are mounted on pusher plates (12, 13) that are moved relative to the work piece (2), held by holders (18a, 18b).

8. The system as recited in claim 7, wherein the pusher plates (12, 13) have recesses (14a, 14b, and 15a, 15b) that permit them to be moved completely into one another and merely leave the suction slot (8) free.

9. The system as recited in claim 7, wherein the pusher plates (12, 13) are guided on rails (16a, 16b).

10. The system as recited in claim 7, wherein setting devices (17a, 17b) are switched synchronously in order to move the pusher plates (12, 13) with the suction mold halves (1a, 1b) towards the work piece (2) and the suction slot (8) synchronously, and thereby position the suction mold halves symmetrically to the work piece.

* * * * *